(12) United States Patent
Armbruster et al.

(10) Patent No.: US 12,496,963 B2
(45) Date of Patent: Dec. 16, 2025

(54) METHOD FOR OPERATING AT LEAST ONE DIRECTION INDICATOR OF A MOTOR VEHICLE, AND MOTOR VEHICLE

(71) Applicant: AUDI AG, Ingolstadt (DE)

(72) Inventors: Tilman Armbruster, Ingolstadt (DE); Stephan Berlitz, Schrobenhausen (DE); Johannes Reschke, Langquaid (DE); Marcel Debelec, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 58 days.

(21) Appl. No.: 18/548,532

(22) PCT Filed: Dec. 7, 2021

(86) PCT No.: PCT/EP2021/084566
§ 371 (c)(1),
(2) Date: Aug. 31, 2023

(87) PCT Pub. No.: WO2022/184302
PCT Pub. Date: Sep. 9, 2022

(65) Prior Publication Data
US 2024/0140305 A1    May 2, 2024

(30) Foreign Application Priority Data
Mar. 3, 2021    (DE) ............... 10 2021 105 077.4

(51) Int. Cl.
*B60Q 1/38*    (2006.01)
*B60Q 1/00*    (2006.01)
(Continued)

(52) U.S. Cl.
CPC ........... *B60Q 1/381* (2022.05); *B60Q 1/0023* (2013.01); *B60Q 11/007* (2013.01)

(58) Field of Classification Search
CPC ..................................................... B60Q 1/381
See application file for complete search history.

(56) References Cited

U.S. PATENT DOCUMENTS

2012/0212320 A1    8/2012    Oberholtzer
2021/0138956 A1*   5/2021    Werner ................ B60Q 1/46
(Continued)

FOREIGN PATENT DOCUMENTS

DE          20010768 U1     11/2000
DE       202013011251 U1     3/2014
(Continued)

OTHER PUBLICATIONS

International Search Report and Written Opinion of the International Searching Authority directed to related International Patent Application No. PCT/EP2021/084566, mailed Apr. 7, 2022, with attached English-language translation; 15 pages.
(Continued)

*Primary Examiner* — Davetta W Goins
*Assistant Examiner* — Pameshanand Mahase
(74) *Attorney, Agent, or Firm* — Sterne, Kessler, Goldstein Fox P.L.L.C.

(57) ABSTRACT

A method for operating at least one direction indicator of a motor vehicle, wherein, as of an actuation time, the direction indicator outputs a light signal comprising a periodic repetition of alternately successive on-phases and off-phases. A discrepancy of a starting phase angle of the light signal with respect to a predefined reference signal is determined at the actuation time and is compared with a predefined target phase angle assigned to the direction indicator. When there is a phase offset between the starting phase angle and the target phase angle—at least two of the on-phases and/or the off-phases of the light signal are extended or shortened by a
(Continued)

Figure 1:
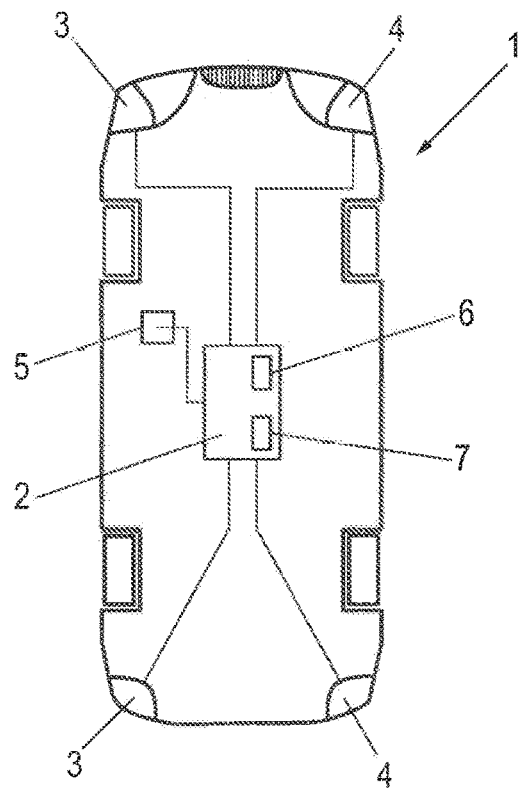

different time difference value in each case after the actuation time such that the phase angle of the light signal with respect to the reference signal then corresponds to the predefined target phase angle, and/or—the light signal is started with a first off-phase (11) at the actuation time. The duration of the first off-phase corresponds to a time offset corresponding to the phase offset between the starting phase angle and the predefined target phase angle, with the result that an on-phase of the light signal following the first off-phase is at the target phase angle with respect to the reference signal.

16 Claims, 3 Drawing Sheets

(51) Int. Cl.
  *B60Q 1/46* (2006.01)
  *B60Q 11/00* (2006.01)

(56) References Cited

U.S. PATENT DOCUMENTS

2022/0080882 A1* 3/2022 Miyashita ............... B60Q 1/343
2022/0169170 A1* 6/2022 Chen ....................... F21S 43/14

FOREIGN PATENT DOCUMENTS

| DE | 102013002875 A1 | 9/2014 | |
|---|---|---|---|
| DE | 102017219535 A1 * | 5/2019 | ............... B60Q 1/34 |
| DE | 102016220054 B4 | 11/2019 | |

OTHER PUBLICATIONS

International Preliminary Report on Patentability directed to related International Application No. PCT /EP2021/084566, with English-language translation attached, mailed on May 15, 2023; 15 pages.

* cited by examiner

METHOD FOR OPERATING AT LEAST ONE DIRECTION INDICATOR OF A MOTOR VEHICLE, AND MOTOR VEHICLE

TECHNICAL FIELD

The present disclosure relates to a method for operating at least one direction indicator of a motor vehicle, with the direction indicator outputting a light signal, from an actuation time, which light signal consists of a periodic repetition of alternating successive on-phases in which at least one illuminant of the direction indicator is illuminated, and off-phases in which the illuminant is switched off, with a deviation of a starting phase angle of the light signal from a predefined reference signal being determined at the actuation time and being compared with a predefined target phase angle assigned to the direction indicator.

The direction indicators of a plurality of motor vehicles, also referred to as indicators of a motor vehicle, generally flash in each case at a separate clock pulse. In the case of a motor vehicle, the clock pulse is usually determined by when the respective direction indicator is switched on by a driver by activating an indicator lever. In this case, the start time for the respective flashing signals is in each case the time of actuation of the indicator lever by the drivers of the vehicles, so that, in the case of a plurality of vehicles, there is no fixed phase reference between the flashing signals generated by the indicators due to the individual indicator actuation. Furthermore, it is also possible that, in the case of a plurality of vehicles, these each have direction indicators which flash at a slightly different frequency, as a result of which a temporally variable phase reference between the flashing signals is produced.

BACKGROUND

In order to create a uniform image of the flashing signals of a plurality of vehicles in road traffic, there are known methods to synchronize the respective flashing signals generated by the vehicles when a direction indicator is activated. Various approaches are known from the prior art for this purpose.

DE 10 2013 002 875 A1 describes a control device for controlling direction indicators of a motor vehicle. In this case, the control device is designed in such a way that the phase and/or the frequency of the flashing of the directional indicators of the motor vehicle can be synchronized with the phase and/or the frequency of the flashing of the directional indicators of at least one unknown vehicle.

DE 10 2017 219 535 A1 describes a method for operating a direction indicator of a motor vehicle. In this case, a clock pulse signal is output for actuating the direction indicator, with a reference clock pulse signal being determined on the basis of a global time signal, and the clock pulse signal being output depending on the reference clock pulse signal.

DE 10 2016 220 054 B4 discloses a method for operating a display device for a guide motor vehicle in a motor vehicle convoy, and a display device of at least one following motor vehicle. In this case, in the case of the motor vehicles driving in convoy, a light pattern signal is determined, which is reproduced at the same time or in the form of a display continuing over a plurality of motor vehicles, via the display devices of the plurality of motor vehicles.

BRIEF DESCRIPTION OF DRAWINGS/FIGURES

Figure 2:
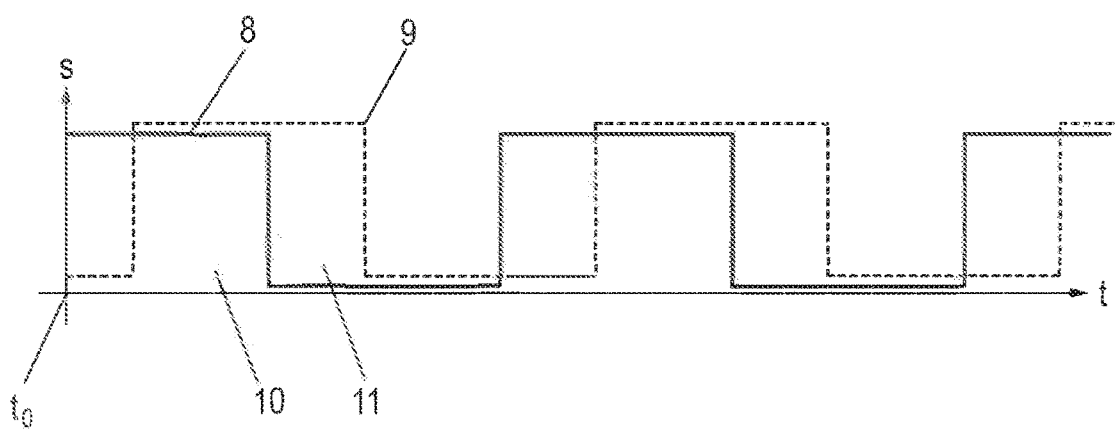
Figure 3:
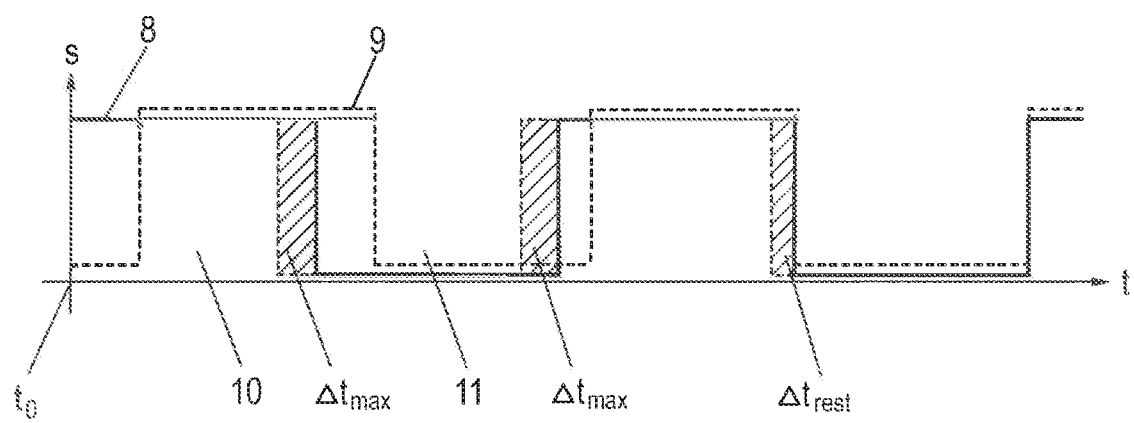
Figure 4:
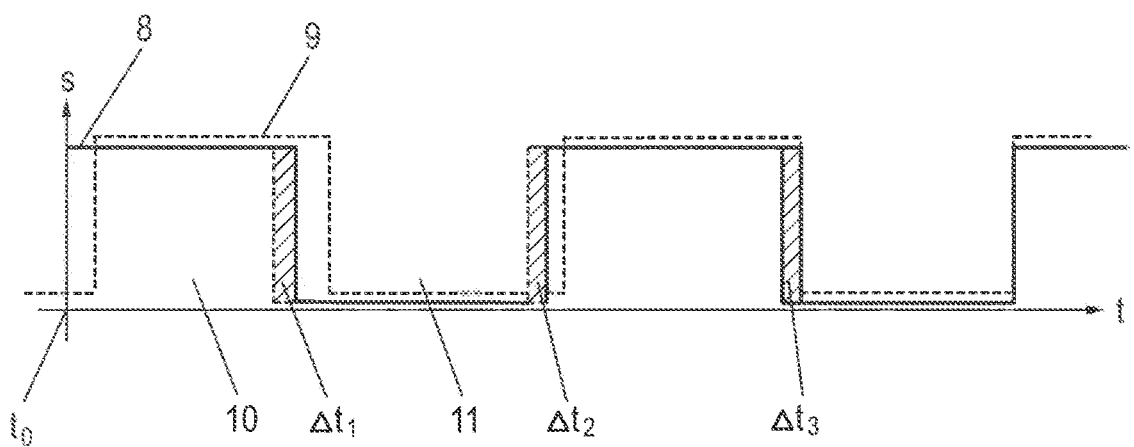
Figure 5:
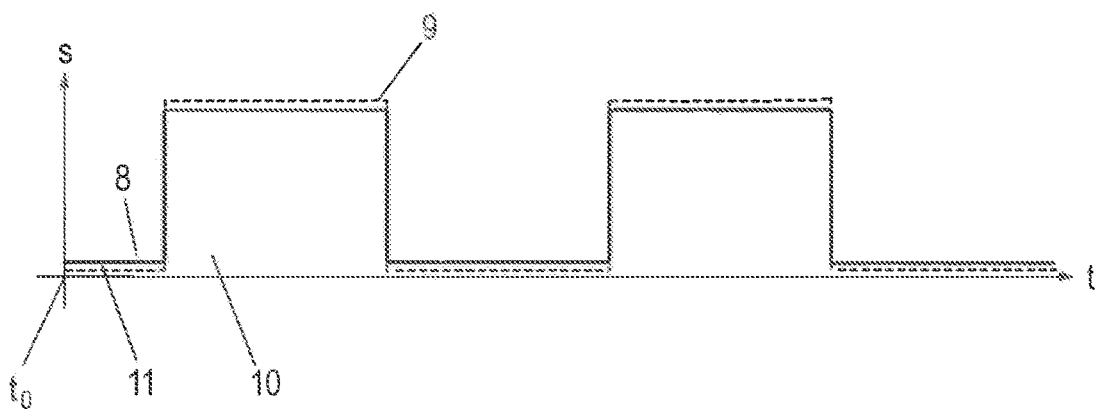
Figure 6:
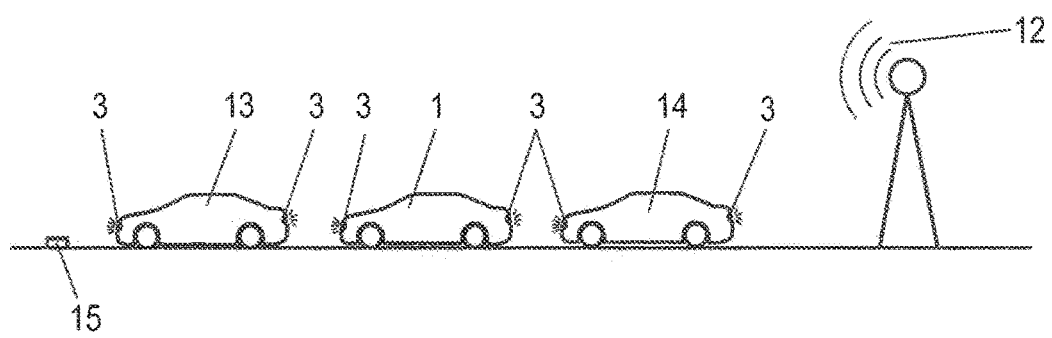

Further advantages and details of the present disclosure arise from the embodiments described below and with reference to the drawings. These are schematic illustrations and show:

FIG. 1 shows a first embodiment of a motor vehicle according to the present disclosure, FIG. 2 is a first graph for explaining embodiments of a method according to the present disclosure, FIG. 3 is a second graph for explaining a first embodiment of a method according to the present disclosure, FIG. 4 is a third graph for explaining a second embodiment of a method according to the present disclosure, FIG. 5 is a fourth graph for explaining a third embodiment of a method according to the present disclosure, and FIG. 6 shows a plurality of motor vehicles for explaining the embodiments of the method according to the present disclosure.

DETAILED DESCRIPTION

The present disclosure is therefore based on the object of specifying an improved method for operating at least one direction indicator of a motor vehicle.

In order to achieve this object, it is provided in accordance with the present disclosure, in a method of the type mentioned at the outset, wherein, when there is a phase offset between the starting phase angle and the target phase angle,
- at least two of the on-phases and/or the off-phases of the light signal are lengthened or shortened by a different time difference value in each case, after the actuation time, so that subsequently the phase angle of the light signal corresponds to the reference signal of the predefined target phase angle, and/or
- the light signal is started with a first off-phase at the actuation time, with the duration of the first off-phase corresponding to a time delay corresponding to the phase offset between the starting phase angle and the predefined target phase angle, so that an on-phase of the light signal following the first off-phase is in the target phase angle with respect to the reference signal.

The light signal to be displayed by the direction indicator comprises a periodic repetition of alternating successive on-phases and off-phases. In the on-phases, the at least one illuminant of the direction indicator lights up, while in the off-phases, the at least one illuminant of the direction indicator is switched off, so that this results in a flashing of the direction indicator or of its illuminant. When the direction indicator is activated via the assigned actuation element at an actuation time, the light signal is output via the direction indicator. In this case, the light signal to be emitted has a starting phase angle with respect to a predefined reference signal, with the starting phase angle resulting from the position of the actuation time with respect to the reference signal.

Synchronous flashing of a plurality of motor vehicles generates a uniform image in road traffic, which improves the perceptibility of direction indicators and thus also of announced driving maneuvers of the motor vehicles. In addition, a synchronous flashing of a plurality of motor vehicles generates a sense of cohesion in users of the motor vehicles designed for synchronous flashing.

In order to enable a synchronization of different direction indicators, a target phase angle is assigned to the at least one direction indicator, with the target phase angle indicating a phase angle, which the light signal should have with respect to the predefined reference signal in order to enable a synchronous operation of the at least one direction indicator, respectively, of the vehicles over a plurality of vehicles. Depending on the position of the actuation time with respect to the reference signal, this results in a different phase offset or a different phase difference between the starting phase angle at the actuation time and the target phase angle, which the light signal should have with respect to the reference signal. In order to generate the synchronous flashing, it is necessary for this phase offset to be reduced or for the occurrence of such a phase offset to be avoided.

By providing the target phase angle, both a synchronous flashing of a plurality of vehicles having light signals, which do not have any phase offset with respect to one another and thus flash simultaneously can be generated, and this results in a synchronous flashing of a plurality of vehicles, the light signals of which have a phase offset with respect to one another that is different from zero and in particular non-variable in time, so that the flashing takes place in a defined sequence or with a predefined pattern.

The synchronous flashing of a plurality of direction indicators of a plurality of vehicles requires the respective light signals, which are output via the direction indicators of the motor vehicles, to each be emitted, in relation to the reference signal, in the target phase angle assigned to the respective direction indicator. This can be achieved in that at least two of the on-phases and/or the off-phases of the light signal are each lengthened or shortened by a different time difference value after the actuation time, so that the phase angle between the light signal and the reference signal corresponds to the predefined target phase angle.

By changing at least two on-phases and/or off-phases, having a different time value in each case, for the matching of the starting phase angle to the target phase angle, a continuous reduction of the phase offset between the starting phase angle and the target phase angle is achieved, as a result of which the adjustment of the phase angle for the light signal of a motor vehicle to a target clock pulse of a further motor vehicle or a group of further vehicles can take place in a perceptible manner. This perception of the setting of the clock pulse synchronization of the light signals can further enhance the sense of cohesion generated by the synchronous flashing.

In this case, the sum of the different time difference values by which the at least two on-phases and/or off-phases are respectively lengthened corresponds to a time offset, which can be calculated from the phase offset between the starting phase angle and the target phase angle. In the case of a phase offset p and a frequency f of the light signal, the time offset t can be determined by means of $$t=(1/f)\cdot(p/360°).$$

The entire time offset resulting in this way can be set by the plurality of different time difference values by which the at least two on-phases and/or off-phases are lengthened or shortened, according to which the phase offset between the starting phase angle and the target phase angle is reduced and the light signal is thus located in the target phase angle in relation to the reference signal. This can be carried out independently of whether the light signal begins with the start of an on-phase, the start of an off-phase, or during an on-phase or off-phase.

Additionally or alternatively, it is possible for the light signal to be started at the actuation time with a first off-phase, with the duration of the first off-phase corresponding to the time offset between the starting phase angle and the target phase angle. In this way, an on-phase of the light signal following the off-phase is in the target phase angle with respect to the reference signal. In this way, a delay of the first on-phase is thus achieved, with the temporal length of this delay corresponding to the time offset, which results from the phase offset between the starting phase angle and the target phase angle. This advantageously makes it possible for a synchronization between the light signal after the actuation time and the reference signal or further motor vehicles to be possible as quickly as possible.

It is possible, for example, for the reference signal to be a time signal, the frequency of which corresponds to the frequency of the light signal, with a phase deviation of zero degrees between the reference signal and the light signal being set as the target phase angle. In this way, the light signal is matched to the reference signal by synchronizing the light signal to the reference signal. In this case, the reference signal can, for example, also be interpreted as a target clock pulse. In addition to setting a phase offset of zero degrees with respect to the reference signal, phase offsets deviating therefrom can also be set, possibly also having different phase offsets in different motor vehicles, so that other phase relationships than complete unison can also be generated between two or more motor vehicles.

According to the present disclosure, it can be provided for an on-phase and/or off-phase or a plurality of successive on-phases and/or off-phases to be lengthened or shortened by a predefined maximum time difference value in each case, an on-phase or off-phase following the at least one phase that is lengthened or shortened by the maximum time difference value being lengthened or shortened by a residual time difference value, which is less than the maximum time difference value. In this case, the sums of the residual time difference value and the maximum time difference values lengthened or shortened in the preceding phases correspond to the time offset, which results from the phase offset between the starting phase angle and the target phase angle.

By providing a maximum time difference value, a maximum difference can be specified by which individual on-phases or off-phases can be lengthened or shortened, at most, in each case. This makes it possible for a maximum value, by which the individual phases can each be lengthened and/or shortened, to be defined in the case of a comparatively large phase offset between the starting phase angle and the target phase angle or a large time offset.

The maximum time difference value prevents individual on-phases and/or off-phases from having a large deviation from the duration of an unlengthened or unshortened on-phase or off-phase, respectively. An unlengthened on-phase and/or off-phase can, for example, be of a length of 400 ms, so that a clock pulse length of 800 ms results for a clock pulse comprising an on-phase and an off-phase. The maximum time difference value can be, for example, between 10 ms and 100 ms, in particular 50 ms.

Since the phase offset between the starting phase angle and the target phase angle depends on the actuation time, a remainder that is less than the maximum time difference value can remain after the lengthening or shortening of one or more on-phases and/or off-phases. For setting the time difference, one or more successive on-phases and/or off-phases can therefore be lengthened or shortened in each case by the maximum time difference value, after which a subsequent on-phase and/or off-phase for the remaining residual time difference is lengthened or shortened.

In a preferred embodiment of the present disclosure, it can be provided for a plurality of successive on-phases and/or off-phases to be lengthened or shortened in each case by a time difference value that decreases with increasing temporal distance from the actuation time. In this case, the time difference value by which the plurality of successive on-phases and/or the off-phases are each lengthened or shortened is always selected to be smaller or shorter the further the shortened or lengthened on-phase and/or off-phase is from the actuation time.

In this way, a continuous reduction of the temporal difference between a lengthened or shortened on-phase and/or off-phase and a correspondingly unlengthened or unshortened on-phase and/or off-phase is achieved. These time difference values that decrease with increasing distance from the actuation time can also be combined in combination with one or more on-phases and/or off-phases, which are lengthened and/or shortened by the maximum time difference value, so that, for example, firstly one or more phases are lengthened and/or shortened by the maximum time difference value after the actuation time, after which a remaining residual difference is lengthened and/or shortened by a plurality of time difference values, which decrease with increasing temporal distance from the actuation time.

According to the present disclosure, it can be provided that the amount by which the time difference value decreases between two successive lengthened or shortened on-phases and/or off-phases is always the same. As a result, the adjustment of the light signal to the target phase angle with respect to the reference signal, or the adjustment to the target clock pulse, can be clearly perceived without a disruptive impression being caused.

In a preferred embodiment of the present disclosure, it can be provided that the on-phase and/or the off-phase, or the on-phases and/or the off-phases, are lengthened if the time offset corresponding to the phase offset of the light signal with respect to the reference signal is greater than half the period of the light signal, and that the on-phase and/or the off-phase, or the on-phases and/or the off-phases, are shortened if the time offset corresponding to the phase angle of the light signal with respect to the reference signal is less than half the period of the light signal. Due to the periodic nature of the light signal or the reference signal, an adjustment of the phase angle between the light signal and the reference signal can be achieved both by lengthening and by shortening of the on-phases and/or the off-phases of the light signal. As a result of the evaluation of whether the time offset between the signals is greater than or less than half the period, it is thus possible to achieve the fastest possible adjustment of the light signal of a reference signal, since only the smaller time offset, in each case, has to be compensated.

It is possible that, in the case of a time offset below or equal to a predefined limit value, the light signal is started as described above with an off-phase in order to generate the time offset corresponding to the phase offset between the starting phase angle and the target phase angle. In this case, in the case of a time offset above the limit value at least two of the on-phases and/or off-phases can be lengthened or shortened as described above, so that the perceptible approaching of the light signal, from the actuation time, to the target phase angle with respect to the reference signal or to the target clock pulse takes place only in the case of a sufficiently large time offset at the actuation time.

According to the present disclosure, it is possible for the reference signal to be derived, in particular cyclically or continuously, from at least one locally or globally receivable time signal. The use of a locally or globally receivable time signal has the advantage that a plurality of vehicles in spatial proximity each receive the same time signal and can derive the reference signal from this in the same manner, so that the direction indicators of these vehicles are all flashing in the same clock pulse or in a manner corresponding to their target phase angles set in each case with respect to the reference signal, after synchronization has taken place.

According to the present disclosure, a signal of a global navigation satellite system, a signal of a radio clock, a signal of an analog radio, a signal of a digital radio, a signal of a mobile radio network, a signal of a motor vehicle communication network and/or an item of time information of a communication network can be used as the time signal.

For example, a time signal of a global navigation satellite system, such as GPS, Galileo, Glonass and/or Beidou, can be used. A DCF77 signal can be used as a signal of a radio clock, for example. The use of radio signals is also possible, for example, an analog RDS signal and/or a digital radio signal, in particular a DAB signal and/or a DAB+ signal. Various signals of mobile radio networks, which also contain time information, can also be consulted for matching the reference signal like specific motor vehicle communication networks, such as Car2X communication networks and/or time information of a communication network according to an NTP and/or PTP standard.

All of the aforementioned signals represent signal types that can also already be received in a motor vehicle for other purposes, so that the use of such signals is possible in a simple manner. Furthermore, such reference signals all go back to a clock time as a fixed reference point, so that different time signals can also be used in different vehicles for deriving a reference signal, the reference signals in each case likewise having a fixed relation to one another due to the fixed time reference of the time signals used, in particular being at least substantially in phase. In this way, it is advantageously made possible to use different time signals in different vehicles and/or to select another of the abovementioned time signals, for example in the absence of one of the time signals being received. For example, a Unix time can be determined from the received time signal, from which a unique reference for the reference signal can in turn be determined.

According to the present disclosure, it can be provided that, when the time signal is not received, a clock pulse signal predefined on the motor vehicle side is used as a reference signal. If an assigned time signal and/or all time signals cannot be received and thus cannot be used, a motor vehicle side clock pulse signal can be used as a reference signal in order to enable the normal operation of the direction indicator, and thus the display of the light signal. In this way, the operation of the direction indicator is possible, for safety reasons, even when the time signal is not received.

The clock pulse signal predefined on the motor vehicle side can be extrapolated, for example, from a reference signal determined at a preceding time, or a clock pulse signal can be used, which is without a reference to the reference signal and/or the time signal, so that the operation of the at least one direction indicator thus takes place in an unsynchronized manner when the time signal is not received.

In a preferred embodiment of the present disclosure, it can be provided that a Unix time is used as the time signal, with the clock pulse of the light signal specified by the reference signal beginning with an on-phase at the Unix epoch corresponding to the time Jan. 1, 1970, 0:00:00.00 according to standardized world time. By means of the Unix time, with effect from the Unix epoch, which corresponds to the time Jan. 1, 1970, 0:00:00.00 according to standardized world time (coordinated universal time, UTC), the time that has elapsed in the meantime is added up. For example, the Unix time can include the added milliseconds that have passed since the Unix epoch, and can thus be used in the form of an integer as a unique time measure. This number or the Unix time can be used to derive a reference signal, with the clock pulse of the light signal described by the reference signal beginning with an on-phase at the time of the Unix epoch.

By dividing the remainder of the Unix time at the actuation time of the direction indicator by the duration of a clock pulse for the light signal, which comprises an on-phase and a subsequent off-phase, the time offset between the light signal and the reference signal or the Unix time at the actuation time can be determined. Subsequently, as has been described above, the time offset can be reduced in order to achieve the desired target phase angle between the light signal and the reference signal.

According to the present disclosure, it can be provided that the duration of the on-phases and the off-phases of the light signal in the target phase angle, in particular in a directional flashing operation and/or a warning flashing operation of the direction indicator, is 400 ms in each case. In this case, the duration of a clock pulse, which comprises an on-phase and an off-phase, is accordingly 800 ms. In other operating modes of the direction indicator, for example, for identifying a successful opening or closing operation and/or an emergency brake flashing, the same or a different duration of the on-phases and the off-phases or the clock pulse can be used. Until the target phase angle is reached, the duration of one or more on-phases and/or one or more off-phases can deviate from 400 ms, in order to enable an adjustment of the phase offset so as to achieve the target phase angle.

In a preferred embodiment of the present disclosure, it can be provided that the reference signal and/or the target phase angle is derived from environment information detected by a sensor device of the motor vehicle having the direction indicator, with the environment information mapping at least one activated direction indicator of a further motor vehicle and a frequency of the reference signal corresponding to the frequency of the direction indicator of the further motor vehicle mapped in the environment information.

In this way, it is made possible for the light signal, which is displayed by the distinct motor vehicle via the at least one direction indicator, to be adjusted to a motor vehicle in the surroundings of the motor vehicle, which is already emitting a light signal via one of its direction indicators. This enables an adjustment or a synchronization of the light signal of the distinct vehicle to the further motor vehicle, even if the further motor vehicle does not ascertain the clock pulse of its light signal with a reference signal corresponding to the distinct vehicle. In this case, a camera, for example, can be used as the sensor device.

According to the present disclosure, it can be provided that the reference signal and/or the target phase angle is determined depending on the environment information from the motor vehicle having the direction indicator and/or an item of phase information transmitted by a further motor vehicle via a communication link. In this case, for example, a Car2X communication, a Visible Light Communication (VLC) and/or a Light Fidelity Communication (LiFi) can be used as the communication link. Via the communication link, phase information can be transmitted from the further motor vehicle to the distinct motor vehicle, with the reference signal and/or the target phase angle of the light signal with respect to the reference signal being determined according to said phase information. This makes it possible to realize a common light pattern, for example, a moving light comparable to light markings on warning beacons or construction site markings, across a plurality of motor vehicles.

The communication link, for example, a Car2X communication, can be used for exchanging a position of the motor vehicles in a queue, for example, behind a stop line at traffic lights or the like. In this case, a separate reference signal or a separate target phase angle with respect to a common reference signal can be determined overall, from the total number of motor vehicles stationary there, for each motor vehicle position, so that a common appearance of the emission of the light signals via the direction indicators is made possible. When individual vehicles are added or removed, the respective reference signals and/or the target phase angles can be adjusted accordingly, so that a common light image, such as a moving light, can be established again by re-adjusting the target phase offset in each motor vehicle.

According to the present disclosure, a distance of the motor vehicle from a stop line can be used as the environment information. In this case, the stop line can be located, for example, in front of traffic lights, at the end of a turning lane, before an intersection, an entry or the like. By means of the distance between the motor vehicle and the stop line, in the case of a plurality of motor vehicles in a queue, for example, the reference signal and/or the target phase angle can be determined in each case, for the motor vehicles, for the purpose of displaying a common light image.

According to the present disclosure, it can be provided that the phase angle of the light signal relative to the reference signal is compared to the target phase angle for the duration of the actuation of the direction indicator, in particular cyclically or continuously, in the event of a deviation of the phase angle from the target phase angle, which is greater than a predefined limit value, with at least one on-phase and/or off-phase of the light signal being lengthened or shortened by a time difference value, so that thereafter the phase angle of the light signal corresponds to the reference signal of the predefined target phase angle.

This enables a direct resynchronization of the light signal to the reference signal, so that the light signal can be emitted as precisely as possible in the target phase angle assigned to it. In this way, small differences in the clock frequency at which the light signal is displayed via the at least one direction indicator can also be corrected. This direct synchronization to the reference signal can be provided additionally or alternatively to an indirect synchronization or a cyclic derivation of the reference signal from the received time signal.

In a preferred embodiment of the present disclosure, it can be provided for at least two direction indicators, each assigned to a different direction of travel and/or a warning signal indication, to be used, the same target phase angle being used in each case, or a different target phase angle being used in each case or for the driving directions to be displayed and/or the warning signal indication. For example, a different target phase angle can be used in each case for left-hand direction indicators and right-hand direction indicators when these are activated individually for displaying an intended driving direction or the like.

For example, the target phase angle for the left-hand direction indicators and the target phase angle for the right-hand direction indicators can each be phase-shifted by 180° relative to the reference signal, so that, for example, at a large intersection, a first group of motor vehicles turning to the left and a second group of motor vehicles turning to the right in each case have light signals synchronized within the group, whereas the two groups each have a phase offset of 180° with respect to one another. In this way, the light signal output in the region of the intersection can be very clearly designed.

Accordingly, a target phase angle that differs from the target phase angle or positions for the flashing, that is to say for the actuation of direction indicators assigned to only one direction of travel, can also be selected for a warning signal indication in which at least two direction indicators, which are assigned to different directions are operated simultaneously, in particular what is known as hazard warning flashing. It is also possible that, upon actuation of the hazard warning lights, the target phase angle of the hazard warning flashing corresponds to the target phase angle of the left-hand direction indicator or the target phase angle of the right-hand direction indicator, or that a target phase angle different from this target phase angle is used. It is also possible for an actuation of the hazard lights to take place without phase synchronization. The latter can be the case, for example, when the hazard lights have a different clock pulse ratio when the ignition is switched off compared with when the ignition is switched on, for example, of the on-phase to the off-phase of 310 ms to 490 ms when the ignition is switched off instead of 400 ms to 400 ms when the ignition is switched on.

For a motor vehicle according to the present disclosure, it is provided that this comprises at least one direction indicator and a control device, with the control device being configured to carry out a method according to the present disclosure.

The advantages and embodiments described above in relation to the method according to the present disclosure apply accordingly to the motor vehicle according to the present disclosure.

FIG. 1 shows an embodiment of a motor vehicle 1 according to the present disclosure. The motor vehicle 1 comprises a control device 2 and a plurality of direction indicators 3, 4. In this case, the direction indicators 3 are arranged on the left-hand side of the motor vehicle and the direction indicators 4 are arranged on the right-hand side of the motor vehicle, so that the direction indicators 3 serve, for example, to indicate a left-hand turn, and correspondingly the direction indicators 4 for identifying a right-hand turn or comparable driving maneuver.

The direction indicators 3, 4 can be activated by an actuation means 5 arranged in an interior of the motor vehicle 1, with the correspondingly activated direction indicators outputting a light signal, which consists of a periodic repetition of alternating successive on-phases, in which at least one illuminant of the direction indicator is illuminated, and off-phases, in which the illuminant of the direction indicator is switched off. The actuation of the actuation means 5 and thus an actuation of the direction indicators 3, 4 takes place at any time by a driver of the motor vehicle 1 during the operation of the motor vehicle 1.

The control device 2 is designed to generate a reference signal and, as will be described in more detail below, can use, for this purpose, information transmitted to a communication device 6 for the control device 2 and/or information received by a receiving device 7 for the control device 2. Depending on the position of the actuation time with respect to the reference signal, the light signal of the direction indicators 3, 4 generated at any actuation time has a different starting phase offset or a different starting phase difference with respect to the reference signal.

This is shown in FIG. 2. In the graph, the time is shown on the x-axis and a signal level s of a light signal 8 and of a reference signal 9 is shown schematically on the y-axis. In this case, the reference signal 9 is shown in dashed lines for reasons of clarity. The light signal 8 has a periodic clock pulse of a predefined frequency, with each clock pulse having an on-phase 10, represented by the high signal level, and an off-phase 11, represented by the low signal level. The reference signal likewise has such a clock rate. As can be seen, there is a phase offset between the light signal 8 and the reference signal 9 at the time to, which corresponds to the actuation time. This phase offset can also be regarded as a time offset, which exists between the light signal 8 and the reference signal 9.

In order to achieve the target phase angle between the light signal 8 and the reference signal 9, the control device 2 can lengthen and/or shorten at least two of the on-phases 10 and/or off-phases 11 of the light signal 8 after the actuation time to in each case by a different time difference value, so that the phase angle of the light signal 8 with respect to the reference signal 9 corresponds to a predefined target phase angle.

This is shown by way of example in FIG. 3, with a phase angle of 0° between the light signal 8 and the reference signal 9 being set as the predefined target phase angle. For this purpose, the first on-phase 10 is lengthened, after the actuation time to, by a maximum time difference $\Delta t_{max}$. The corresponding lengthening of the on-phase 10 is illustrated by the hatched region 12.

The off-phase 11 following the on-phase 10 is also correspondingly lengthened by the maximum time difference value $\Delta t_{max}$. The subsequent further on-phase, following the off-phase 11, is lengthened by a residual time difference value $\Delta t_{rest}$, so that, overall, a time difference of $2 \times \Delta t_{max} + \Delta t_{rest}$ has been set between the light signal 8 and the reference signal 9, in the present embodiment, this time difference corresponding to the phase offset between the light signal 8 and the reference signal 9. This adjustment is purely by way of example—depending on the size of the phase offset between the light signal 8 and the reference signal 9, a different number of on-phases and/or off-phases can also be lengthened by the maximum time difference $\Delta t_{max}$.

The time duration of the on-phase 10 and the off-phase 11 can each be 400 ms, for example, so that a cycle duration of 800 ms overall results for a clock pulse of the light signal 8. If, for example, a time offset of 220 ms between the light signal 8 and the reference signal 9 is obtained and the maximum time difference $\Delta t_{max}$ is determined at 50 ms per individual phase, for example, a synchronization of the light signal 8 to the reference signal 9 can take place by the lengthening of two on-phases and two off-phases in each case, by 50 ms each, with a following on-phase being lengthened by a residual time difference $\Delta t_{rest}$ of 20 ms, so that an adjustment of the light signal 8 to the reference signal 9 takes place within five phases. A division of the resulting residual time difference $\Delta t_{rest}$ over a plurality of on-phases and a plurality of off-phases is also possible, so that, for example, instead of a lengthening of the following on-phase by the residual time difference $\Delta t_{rest}$ of 20 ms, this on-phase and the following off-phase are lengthened by $\Delta t_{rest}/2$, i.e. 10 ms, respectively.

A further embodiment of an adjustment is shown in the graph in FIG. 4. In this case, the starting phase angle between the light signal 8 and the reference signal 9 is adjusted to the target phase angle, that is to say a phase offset of 0°, by the lengthening of a plurality of successive on-phases and off-phases, in each case by a time difference value that decreases with increasing temporal distance from the actuation time.

In this case, the first on-phase 10 after the actuation time to is lengthened by a time difference value of $\Delta t_1$, the following off-phase 11 by a time difference value $\Delta t_2$, and the following on-phase by a time difference value $t_3$, where $\Delta t_3$ is less than $\Delta t_2$ and $\Delta t_2$ is less than $\Delta t_1$. Overall, in the three phases, a time offset between the light signal 8 and the reference signal 9 of $\Delta t_1$ plus $\Delta t_2$ plus $\Delta t_3$ can be compensated for. By compensating for this time offset between the light signal 8 and the reference signal 9, the light signal 8 can be brought from the starting phase angle into the target phase angle in relation to the reference signal.

It is also possible for matching to be carried out in more than three phases, for example a first phase, for example having a phase duration of 450 ms, a second having a phase duration of 444 ms, a third having a phase duration of 438 ms, a fourth having a phase duration of 432 ms, a fifth having a phase duration of 426 ms, a sixth having a phase duration of 420 ms, and a seventh having a phase duration of 410 ms can be operated in the case of a phase duration of 400 ms and an offset of 220 ms relative to the target clock pulse or to the reference signal 9, so that a continuous adjustment of the light signal 8 to the reference signal 9, which in particular can be perceived as non-disruptive, takes place by means of the respectively decreasing time differences, which result between the lengthened phase durations and the original phase duration of 400 ms.

In the case of this type of adjustment, it is possible for the amount by which the time difference values $\Delta t_i$, decreasing from the actuation time to, decrease in each case to be kept constant, so that the difference between two successive decreasing time difference values is the same in each case, with this difference being selected in such a way that an adjustment of the starting phase angle to the target phase angle takes place in a number of predefined clock pulses. Therefore, the amount by which the time difference value between two successive lengthened or shortened on-phases 10 and/or off-phases 11, in each case, decreases can always be the same.

A combination between the embodiment shown in FIG. 3 and the embodiment shown in FIG. 4 is also possible, initially a predefined number of the on-phases 10 and/or the off-phases 11 each being lengthened by the maximum permissible time difference $\Delta t_{max}$, and then a remaining residual value $\Delta t_{rest}$, which in this case is also greater than the maximum time difference $\Delta t_{max}$, can be compensated as a plurality of time differences $\Delta t_1$ over a plurality of the on-phases 10 and/or off-phases 11. In this case, the plurality of time differences $\Delta t_1$ can for example decrease with increasing temporal distance from the actuation time to, i.e. become smaller in each case.

A further possibility for adjusting the phase angle of the light signal 8 to the reference signal 9 is shown in FIG. 5. In this case, in contrast to the possibilities described above, the light signal 8 is started, at the actuation time to, with an off-phase 11 instead of with an on-phase 10. In this case, the duration of the first on-phase 11 corresponds to the phase offset between the starting phase angle and the predefined target phase angle between the light signal 8 and the reference signal 9, so that the on-phase 10 following the first off-phase 11 is already located in the target phase angle, which also corresponds to 0° in the present example. A combination of this embodiment with one of the further embodiments is also possible, with a part of the time delay to be compensated overall being formed by the duration of an off-phase that occurs directly after the actuation time.

It is also possible for the light signal 8 to begin, at the actuation time to, with an off-phase, if the time offset to be matched is less than or equal to a limit value, in particular a value for the maximum time difference $\Delta t_{max}$, and, in the case of a time difference greater than the limit value or $\Delta t_{max}$, for an adjustment, as described above, to be carried out by lengthening or shortening two or more successive on-phases and/or off-phases.

In all the above-described embodiments, instead of a lengthening of an on-phase and an off-phase, it is also possible for only a lengthening of the on-phases or only a lengthening of the off-phases to be carried out. Additionally or alternatively, it is also possible for the on-phases and/or the off-phases to be shortened in each case. In this case, in particular, a lengthening of the on-phases and/or of the off-phases can take place if the time offset corresponding to the phase offset of the light signal 8 with respect to the reference signal 9 is greater than half the period of the light signal, i.e. the time durations of the on-phases or off-phases. Accordingly, shortening of the on-phase and/or the off-phase, and/or of the on-phases or the off-phases can take place if the time delay corresponding to the phase offset of the light signal with respect to the reference signal is less than half the period of the light signal 8.

As illustrated in FIG. 6, the reference signal of the motor vehicle 1 can be derived from a locally or globally receivable time signal 12. This makes it possible for a corresponding reference signal, based on the locally or globally received time signal, to also be generated in further vehicles 13, 14, so that a synchronous operation of the direction indicators 3, 4 of motor vehicles 1, 13, 14 is made possible.

In this case, a signal comprising absolute time information can be used as the time signal 12. For example, a signal of a global navigation satellite system, e.g. GPS, Galileo, Glonass and/or Beidou, can be used as the time signal. The use of a signal of a radio clock, for example a DCF77 signal, of the signal of an analog radio, such as an RDS signal, or the signal of a digital radio, such as a DAB signal and/or a DAB+ signal, is also possible. The locally or globally receivable time signal can also be present via a signal of a mobile radio network, a signal of a motor vehicle communication network, e.g. a Car2X communication network, and/or as time information of another communication network, e.g. according to the NTP and/or the PTP standard.

In this case, the time signal 12 can be present, for example, in a Unix format or can be converted by the control device 2 of the motor vehicle 1 to such a format. In this way, a time signal 12 is obtained that has the same reference, primarily the current clock time, for all motor vehicles 1, 13, 14 receiving the time signal 12 or a comparable other time signal. Accordingly, the reference signals 9 of the individual motor vehicles 1, 13, 14 can be derived from these time signals 12, so that the adjustment of the phase offset between the respective light signal 8 of the motor vehicles 1, 13, 14 and the reference signals 9, generated for example in the same manner in each case, results from the time signal 12.

The Unix time sent as a locally or globally receivable time signal 12 is a variable having a length of 32 bits, which has been counted up by one increment every second since Jan. 1, 1970 at 00:00. From this time value, the time difference from the aforementioned date, and thus the current clock time, can be determined. In order to calculate the reference signal 9, this Unix time can be converted, for example, into milliseconds and divided by the duration of a flashing clock pulse, e.g. 800 ms. In this case, the left-over remainder of this modulo operation represents, for each of the motor vehicles 1, 13, 14, the deviation of the reference signal 9 or from its target clock pulse, with it being possible for these to be different depending on the respective actuation times of the corresponding actuation means 5 of the motor vehicles 1, 13, 14. In the case of a deviation of more than 400 ms, e.g. 800 ms can be subtracted, so that either positive values by which the corresponding phases can be lengthened, or negative values by which the corresponding phases are shortened, can be obtained. The corresponding lengthening or shortening of individual on-phases and/or off-phases can then take place as described above.

In the absence of the time signal 12 being received, a clock signal predefined on the motor vehicle side and, in particular, generated by the control device 2 can be used for the clock difference signal 9 as reference signal 9, so that, in the event of a fault, a light signal output can continue to take place. If the time signal 12 is not available, it is also possible to extrapolate a reference signal 9 consulted in a preceding actuation of a direction indicator.

It is also possible for the reference signal and/or a target phase angle of one of the motor vehicles 1, 13, 14 to be derived from environment information, with the environment information mapping at least one activated direction indicator of a further motor vehicle. In this case, a frequency of the reference signal 9 can correspond to the frequency of the direction indicator 3, 4 of the further motor vehicle 13, 14 mapped in the environment information. By way of example, a sensor device of the motor vehicle 1 can detect a flashing of the motor vehicle 13, whereupon a reference signal 9 is generated by the control device 2, which reference signal corresponds to the phase angle and the frequency of the flashing of the further motor vehicle 13. Based on this reference signal 9, the motor vehicle 1 can now set a target phase angle and thus carry out its own flashing, that is to say itself show the light signal 8 via the direction indicators 3. In this case, the flashing of the motor vehicle 13 can be detected, for example, via a sensor device of the motor vehicle 1, which is connected to the control device 2 and comprises a camera.

It is possible for the reference signal and/or the target phase angle to be determined depending on the environment information of the motor vehicle 1. For this purpose, for example a distance of the motor vehicle 1 from a stop line 15 can be used as the environment information. This makes it possible that, if the motor vehicles 1, 13, 14 are each designed to carry out the method, a synchronous flashing of the direction indicators 3 can be set. In this case, the synchronous flashing can take place in unison. It is also possible for the motor vehicles 1, 13, 14 located, for example, on a left-turning lane to actuate their direction indicators 3 in each case for synchronous flashing in such a way that a moving signal, which runs from the vehicle 13 via the vehicle 1 to the vehicle 14, is established. Such a moving light can be achieved by assigning different target phase angles in the motor vehicles 13, 1, 14. This target phase angle can be selected for each of the motor vehicles 1, 13, 14, for example, depending on a distance from the stop line 15.

It is also possible for the reference signal and/or the target phase angle to be determined depending information transmitted to the motor vehicle 1 from a further motor vehicle 13, 14 via a communication link. In this case, for example, a Car2X communication, a Visible Light Communication (VLC) and/or a Light Fidelity Communication (LiFi) can be used as the communication link. The communication of the motor vehicles 1, 13, 14 with one another makes it possible for the motor vehicles to determine different reference signals 9 and/or identical reference signals 9 having different target phases for a synchronous flashing, and in particular, for displaying a moving light or the like, so that overall the desired effect results when the direction indicator 3 is activated.

In order, in the case of the motor vehicle 1, to obtain as little deviation as possible between the actuation of the direction indicator 3 or the displaying of the light signal 8 and a determined reference, the reference signal can be derived cyclically from the time signal 12, so that an indirect synchronization to the reference time used for the time signal 12 is possible. Additionally or alternatively, the phase angle of the light signal 8 with respect to the reference signal 9 can also be compared with the target phase angle, in particular cyclically or continuously, for the duration of the actuation of the direction indicator 3. In the event of a deviation of the current phase angle from the target phase angle which is greater than a predefined limit value stored in the control device 2, at least one on-phase and/or off-phase of the light signal can be lengthened or shortened by a time difference value, so that thereafter the phase angle of the light signal 8 with respect to the reference signal corresponds again to the predefined time phase angle. This enables a direct synchronization of the light signal 8, which is represented by the direction indicator 3, to the reference signal determined in the control device 2.

Different target phases for the relation to reference signal 9 can be assigned to the direction indicator 3 assigned to the left-hand direction of travel in the present examples and to the direction indicator 4 assigned to the right-hand direction of travel. This makes it possible for flashing on the left-hand side, that is to say via the direction indicators 3, and flashing on the right-hand side, that is to say via the direction indicators 4, to take place, in each case having a phase offset of, for example, 180° to one another. In the case of a group of motor vehicles 1, 13, 14, this generates a homogeneous and uniform appearance, the vehicles flashing in different directions being easily distinguishable due to the time offset between the individual on-phases of the light signals 8. In the case of a warning flashing, that is to say a simultaneous actuation or a simultaneous on-phase of both the direction indicator 3 assigned to the left-hand direction of travel and the direction indicator 4 assigned to the right-hand direction of travel, a further reference signal and/or a further target phase reference can be assumed. It is also possible that, for the hazard warning flashing, the target phase reference or the reference signal corresponds to the direction indicator 3 or the direction indicator 4.

By adjusting the phase offset or the time offset between the light signal 8 after the actuation time and the reference signal 9, the adjustment of the light signal 8 to the reference signal 9, and thus also an adjustment to a synchronous flashing clock pulse of a plurality of vehicles, can take place. The use of an off-phase at the beginning of the signal makes it possible for only the synchronized flashing to be visible and no adjustment of the clock pulses to be identified. By lengthening or shortening one or more on-phases and/or off-phases, the function of the indicator synchronization can be made visible in order to additionally increase a sense of cohesion among the motor vehicles 1, 13, 14.

The synchronized flashing generates a uniform flashing signal, which leads to a uniform and street appearance. Any phase differences that can be present between a left-hand flashing and a right-hand flashing contribute to improved traffic perception, since vehicles emitting flashing signals in different directions can be better distinguished from one another.

A preferred embodiment of the method uses the Unix time as the time signal 12, which is obtained from a GPS signal received from the motor vehicles 1, 13, 14. In this case, the use of a GPS signal for obtaining the Unix time has the advantage that the Unix time is present with high accuracy in the GPS signal, since this is required in the context of a GPS system for determining the position. Alternatively, the Unix time from another source or another type of signal can also be consulted.

In this case, the reference signal 9 is derived from the Unix time, for example, counted up in milliseconds since Jan. 1, 1970 at 0:00:00.00 UTC, known as the Unix epoch, with the reference signal 9 beginning, at the time of the Unix epoch, with an on-phase. In this case, the clock pulse of the light signal 8 predefined by the reference signal 9 has a duration of 800 ms, with the clock pulse comprising an on-phase and an off-phase of 400 ms duration in each case. The light signals 8 of the motor vehicles 1, 13, 14 also correspondingly have on-phases and off-phases of 400 ms in each case, at least from the setting of the target phase offset in a direction indicating operation and a warning flashing operation of the direction indicators 3 and/or the direction indicators 4.

As has been described with respect to the preceding embodiments, the light signal 8 can be adjusted, from the actuation time, to the reference signal 9, in this embodiment, with a target phase angle of 0° being set. This results in the motor vehicles 1, 13, 14 flashing synchronously with one another at the latest from the time at which the target phase angle is reached.

From the time at which the target phase angle is reached, the light signals 8 of the motor vehicles 1, 13, 14 also flash synchronously with the reference signal 9 derived from the Unix time, with the light signals 8 having on-phases and off-phases of 400 ms in each case, from the time at which the target phase angle is reached. As a result of the synchronization to the reference signal, the motor vehicles 1, 13, 14 thus flash as though they were flashing since the Unix epoch, starting with an on-phase and a duration of the clock pulse of 800 ms. A uniform flashing can be achieved in this way for a group of motor vehicles 1, 13, 14.

The invention claimed is:

1. A method for operating a direction indicator of a motor vehicle, the method comprising:
   outputting a light signal by the direction indicator, starting from an actuation time;
   producing a periodic repetition of alternating successive on-phases in which at least one illuminant of the direction indicator is illuminated, and off-phases, in which the at least one illuminant is switched off;
   determining, at the actuation time, a phase offset, the phase offset being a deviation of a starting phase angle of the light signal from a reference signal;
   comparing the deviation to a predefined target phase angle assigned to the direction indicator; and
   lengthening or shortening at least two on-phases and/or off-phases of a plurality of on-phases and/or off-phases of the light signal after the actuation time, by a different time difference value, in response to a presence of a phase offset between the starting phase angle and the predefined target phase angle so that thereafter a phase angle of the light signal is equal to the predefined target phase angle.

2. The method of claim 1, wherein the lengthening or shortening further comprises:
   lengthening or shortening the plurality of on-phases and/or off-phases of the light signal by the time difference value equal to a predetermined maximum time difference value; and
   lengthening or shortening an on-phase or off-phase following the plurality of on-phases and/or off-phases that are lengthened or shortened by the maximum time difference value, by an other time difference value equal to a residual time difference value, which is less than the predetermined maximum time difference value.

3. The method of claim 1, further comprising decreasing an other time difference value with increasing temporal distance from the actuation time.

4. The method of claim 1, further comprising decreasing an other time difference value between two successive lengthened or shortened on-phases and/or off-phases by a same amount.

5. The method of claim 1, wherein the lengthening or shortening further comprises:
   lengthening the at least two on-phases and/or the off-phases if a time offset corresponding to the phase offset of the light signal with respect to the reference signal is greater than half a period of the light signal; and
   shortening the at least two on-phases and/or the off-phases if the time offset corresponding to the phase offset of the light signal with respect to the reference signal is less than half the period of the light signal.

6. The method of claim 1, further comprising deriving the reference signal cyclically or continuously, from at least one locally or globally receivable time signal.

7. The method of claim 6, further comprising using a signal of a global navigation satellite system, a signal of a radio clock, a signal of an analog radio, a signal of a digital radio, a signal of a mobile radio network, a signal of a motor vehicle communication network, and/or an item of time information of a communication network as a time signal.

8. The method of claim 7, further comprising using a clock signal predefined on the motor vehicle as the reference signal, if the time signal is not received.

9. The method of claim 7, further comprising using a Unix time as the time signal, a clock pulse of the light signal being predetermined by the reference signal beginning with an on-phase at a Unix epoch corresponding to the time Jan. 1, 1970, 0:00:00.00 according to standardized world time.

10. The method of claim 1, further comprising setting a duration of actuation of the plurality of on-phases and the off-phases of the light signal with the target phase angle, in direction-indicating operation and/or hazard-indicating operation of the direction indicator as 400 ins.

11. The method of claim 1, further comprising:
   deriving the reference signal and/or the target phase angle from environment information detected by a sensor device of the motor vehicle,
      wherein the environment information includes at least one actuated direction indicator of a further motor vehicle, and
      wherein a frequency of a direction indicator of the further motor vehicle corresponds to a frequency of the direction indicator of the motor vehicle.

12. The method of claim 11, further comprising assigning a first direction indicator assigned to a first direction of travel and assigning a second direction indicator assigned to a second direction of travel, wherein the first direction indicator and the second direction indicator use same target phase angle or different target phase angles for the first and second directions of travel and for displaying a warning signal.

13. The method of claim 1, further comprising determining the reference signal and/or the target phase angle based on environment information from the motor vehicle and/or phase information transmitted from a further motor vehicle via a communication link.

14. The method of claim 13, further comprising using a distance between the motor vehicle and a stop line as the environment information.

15. The method of claim 1, further comprising:
cyclically or continuously comparing the phase angle of the light signal relative to the reference signal with the target phase angle for a duration of actuation of the direction indicator; and
lengthening or shortening the phase angle by an other time difference value in response to a deviation of the phase angle from the target phase angle greater than a predetermined threshold value, so that thereafter the phase angle of the light signal corresponds to the reference signal of the predefined target phase angle.

16. A motor vehicle comprising:
at least one direction indicator; and
a control device configured to:
  output a light signal by the at least one direction indicator, starting from an actuation time, wherein the at least one direction indicator is configured to:
  produce a periodic repetition of alternating successive on-phases in which at least one illuminant of the at least one direction indicator is illuminated, and off-phases, in which the at least one illuminant is switched off;
determine, at the actuation time, a phase offset, the phase offset being a deviation of a starting phase angle of the light signal from a reference signal;
compare the deviation to a predefined target phase angle assigned to the at least one direction indicator; and
lengthen or shorten at least two on-phases and/or off-phases of a plurality of on-phases and/or off-phases of the light signal after the actuation time, by a different time difference value, in response to a presence of a phase offset between the starting phase angle and the predefined target phase angle so that thereafter the starting phase angle of the light signal is equal to the predefined target phase angle.

\* \* \* \* \*